United States Patent
Oman et al.

(10) Patent No.: US 12,416,230 B2
(45) Date of Patent: Sep. 16, 2025

(54) SOLID PARTICLE HANDLING ASSEMBLY AND METHOD FOR USE OF SAME

(71) Applicant: Texas Institute of Science, Inc., Richardson, TX (US)

(72) Inventors: Simon Oman, Ljubljana (SI); Marko Nagode, Ljubljana (SI); Aleš Gosar, Ljubljana (SI); Jernej Klemenc, Ljubljana (SI); Domen Šeruga, Ljubljana (SI); Laslo Olah, Richardson, TX (US)

(73) Assignee: Texas Institute of Science, Inc., Richardson, TX (US)

( * ) Notice: Subject to any disclaimer, the term of this patent is extended or adjusted under 35 U.S.C. 154(b) by 41 days.

(21) Appl. No.: 18/540,279

(22) Filed: Dec. 14, 2023

(65) Prior Publication Data

US 2025/0129700 A1    Apr. 24, 2025

Related U.S. Application Data

(60) Provisional application No. 63/592,798, filed on Oct. 24, 2023.

(51) Int. Cl.
*E21B 43/34* (2006.01)
*B01D 21/00* (2006.01)
*E21B 43/12* (2006.01)
*E21B 43/38* (2006.01)

(52) U.S. Cl.
CPC .......... *E21B 43/35* (2020.05); *B01D 21/0003* (2013.01); *E21B 43/121* (2013.01); *E21B 43/38* (2013.01)

(58) Field of Classification Search
CPC ........ E21B 43/35; E21B 43/121; E21B 43/38; B01D 21/0003
See application file for complete search history.

(56) References Cited

U.S. PATENT DOCUMENTS

| | | |
|---|---|---|
| 8,863,849 B2 | 10/2014 | Patel |
| 2012/0215364 A1* | 8/2012 | Rossi .............. E21B 43/121 700/281 |
| 2014/0014358 A1* | 1/2014 | Leitch .............. E21B 43/08 166/105.4 |
| 2015/0308434 A1 | 10/2015 | Crane et al. |
| 2018/0283155 A1* | 10/2018 | Saponja .............. E21B 43/38 |
| 2021/0180429 A1* | 6/2021 | Brown .............. E21B 43/128 |

* cited by examiner

*Primary Examiner* — Theodore N Yao
(74) *Attorney, Agent, or Firm* — Scott Griggs; Griggs Bergen LLP

(57) ABSTRACT

A solid particle handling system for downhole pumps operating at low flow rates is disclosed. In one embodiment, the system includes an outer tubing, such as a production tubing, and an additional inner tubing positioned therewithin. This configuration facilitates increased fluid speed, promoting vertical movement of solid particles. A designated storage area between the outer tubing and the inner tubing accumulates particles, while a diverter optimizes fluid redirection and particle flow. In one operational mode, the fluid medium, along with solid particles, flows at an increased speed through the smaller diameter inner tubing. In another mode, accumulated particles are stored in the designated area, preventing pump blockage.

15 Claims, 3 Drawing Sheets

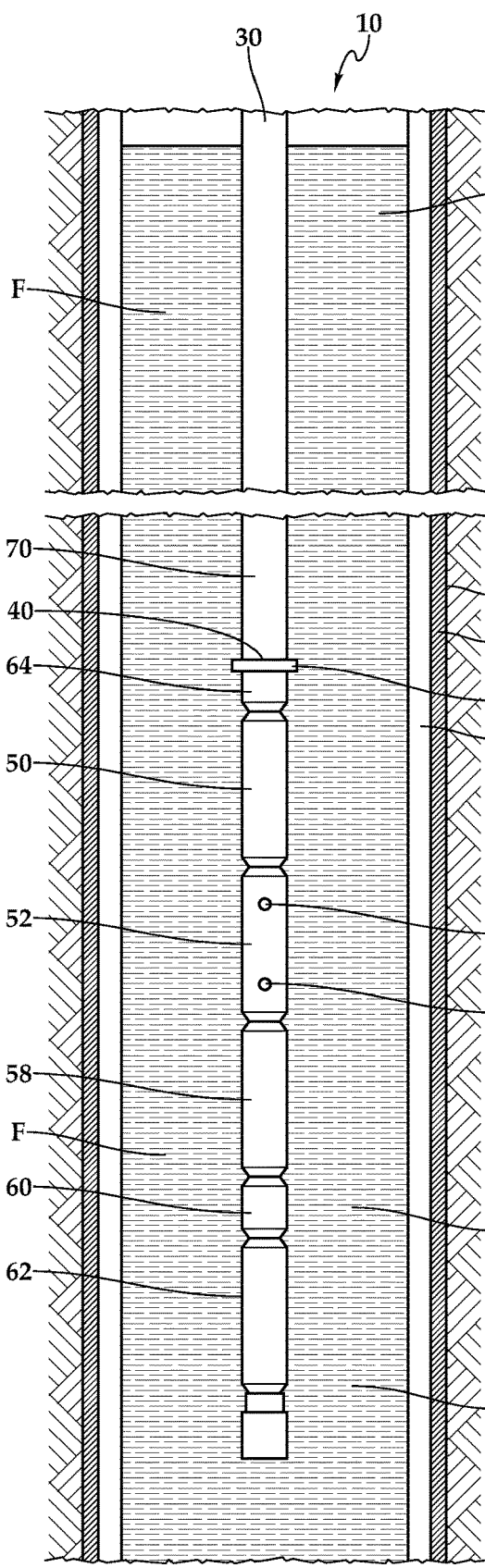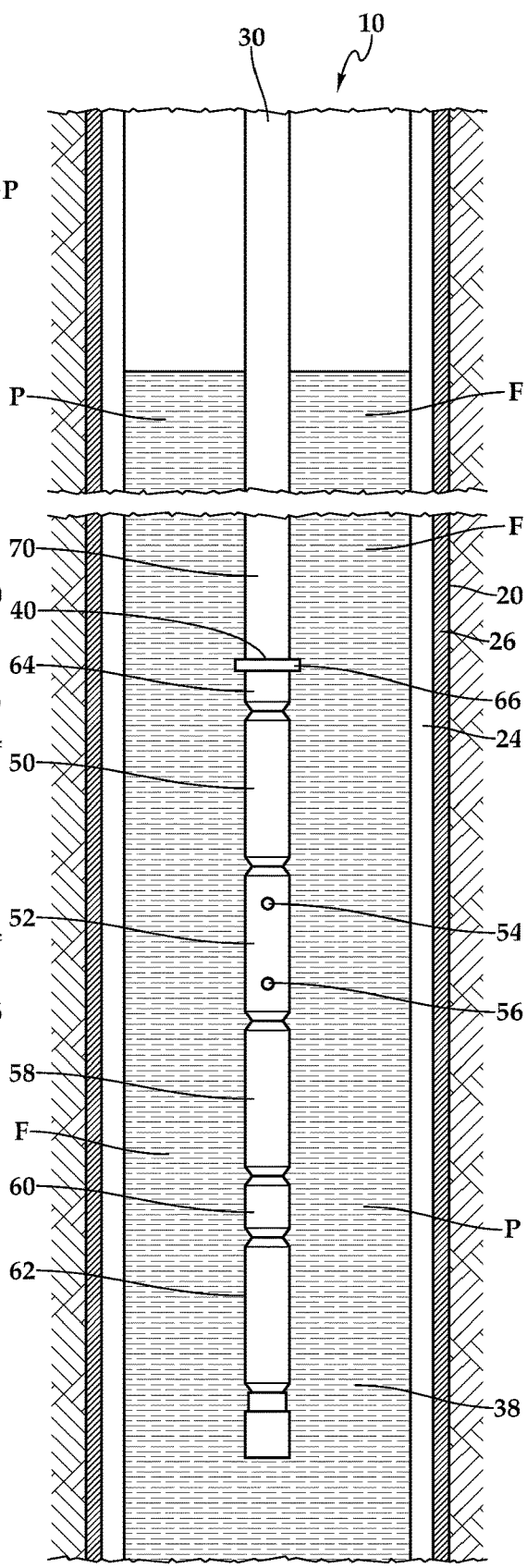
*Fig.2*  *Fig.3*

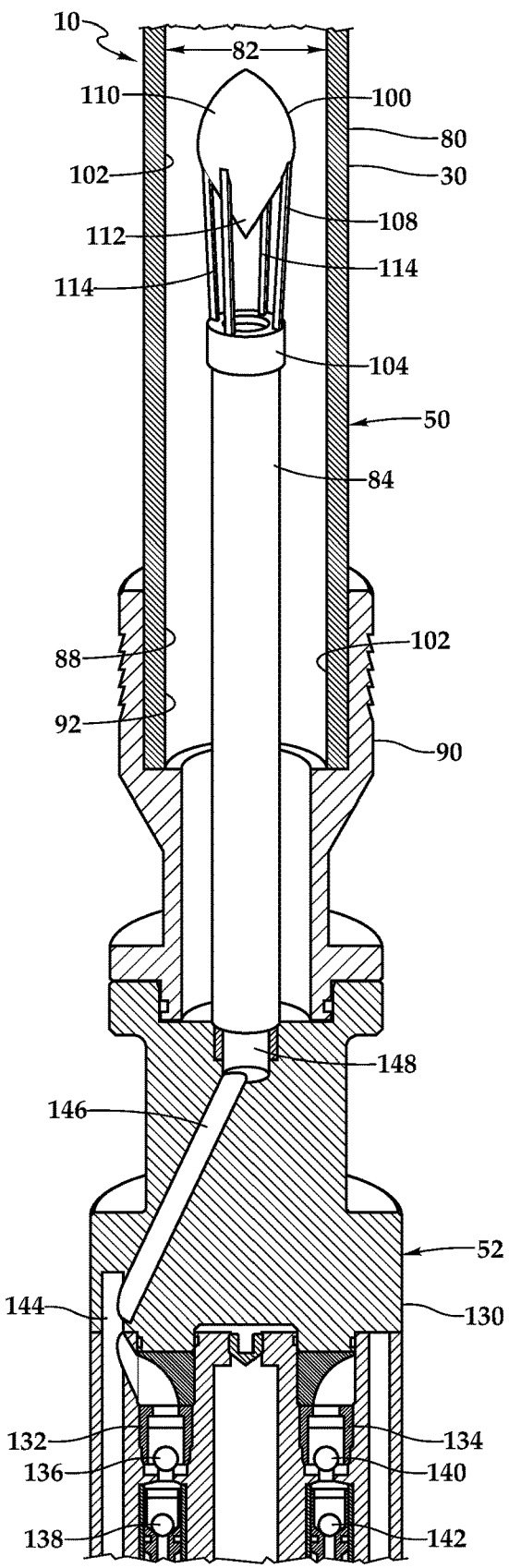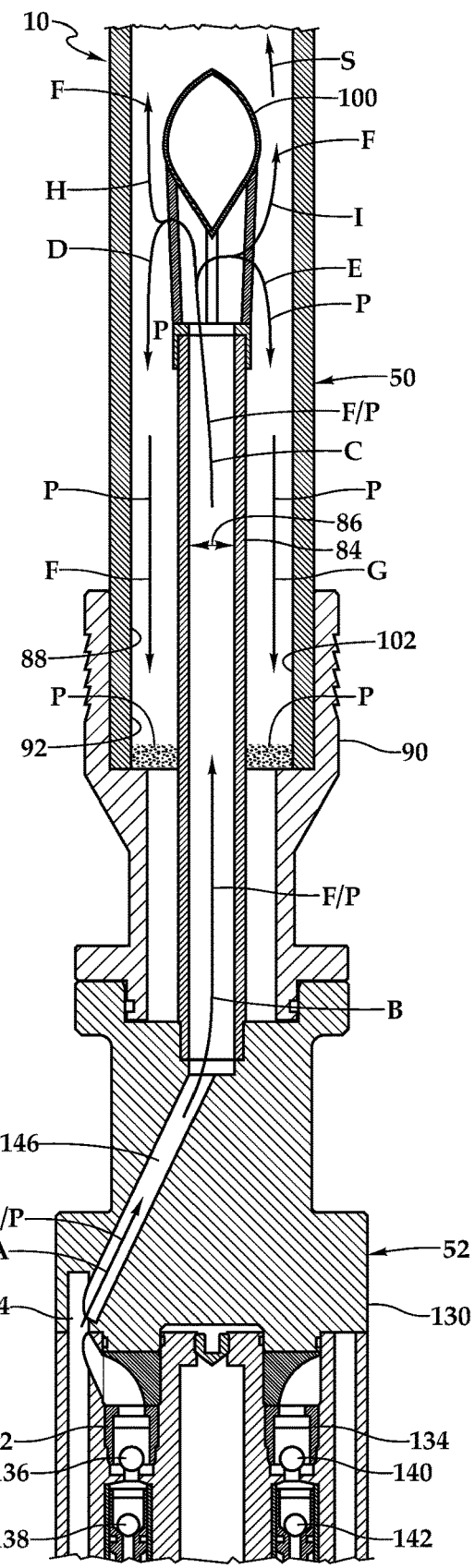
*Fig.4*  *Fig.5*

SOLID PARTICLE HANDLING ASSEMBLY AND METHOD FOR USE OF SAME

PRIORITY STATEMENT & CROSS-REFERENCE TO RELATED APPLICATIONS

This application claims priority from provisional U.S. Patent Application Ser. No. 63/592,798 entitled "Solid Particle Handling Assembly and Method for Use of Same" filed on Oct. 24, 2023 in the name of Laslo Olah; which is hereby incorporated by reference, in entirety, for all purposes.

TECHNICAL FIELD OF THE INVENTION

This invention relates, in general, to downhole submersible pumps and, in particular, to solid particle handling assemblies for use with downhole submersible pumps for the removal of solid particles from fluid mediums with low flow rates, during hydrocarbon production from a well, for example.

BACKGROUND OF THE INVENTION

In situations where downhole pumps operate at low flow rates with the presence of solid particles in the pumped fluid, a common challenge arises—the accumulation of solids in the production tubing above the pump. The vertical transport of the solid particles towards the surface requires the fluid to maintain a certain speed. However, when the fluid together with solid particles from the pump enters the production pipe, which usually has a much bigger diameter/cross-section than the pump channels, the fluid speed drastically drops, hindering the vertical movement of solid particles. Consequently, larger solid particles settle at the top of the pump (bottom of the production tube), while smaller particles may still have enough thrust to flow vertically. The accumulation of these particles at the top of the pump can obstruct fluid flow, leading to increased pressure and potentially causing pump failure. A similar issue can occur when the pump is stopped after a period of operation, causing all particles within the production tubing to fall back and gather at the top of the pump. Existing solutions, such as fallback preventers, address some aspects of this problem but fail to overcome the challenges posed by low flow rates in transporting solid particles vertically through the production tubing. Accordingly, there is a need for improved solid particle handling solutions and methods for use of the same that efficiently operate across different hydrocarbon producing wells over the life of the hydrocarbon producing well.

SUMMARY OF THE INVENTION

It would be advantageous to achieve a solid particle handling solution and method for use of same that would improve upon existing limitations in functionality. It would also be desirable to enable a mechanical-based solution that would provide enhanced operational efficiently across different producing wells or other environments requiring the removal of solid particles from fluid mediums with low flow rates. To better address one or more of these concerns, a solid particle handling assembly for use with a downhole pump for the removal of solid particles from fluid mediums with low flow rates and method for use of the same are disclosed. In one aspect, some embodiments include an outer tubing, such as a production tubing, and an additional smaller diameter inner tubing positioned therewithin. This configuration facilitates increased fluid speed, promoting the vertical movement of solid particles within the fluid medium. A designated storage area between the outer tubing and the inner tubing accumulates particles, while a diverter optimizes fluid redirection and particle flow. In one operational mode, the fluid medium, along with solid particles, flows at an increased speed through the smaller diameter inner tubing. In another mode, accumulated particles are stored in the designated area, preventing pump blockage. The system enhances pump reliability, especially in scenarios with solid particle presence. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 2 is a schematic illustration depicting one embodiment of the hydrocarbon production operation of FIG. 1 in a first stage of removing a fluid medium with a low flow rate with the presence of solid particles;

FIG. 3 is a schematic illustration depicting one embodiment of the hydrocarbon production operation of FIG. 1 in a second stage of removing a fluid medium with a low flow rate with the presence of solid particles;

FIG. 4 is a schematic diagram depicting one embodiment of the solid particle handling assembly of FIG. 1; and FIG. 5 is a schematic diagram depicting a partial cross section of the solid particle handling assembly of FIG. 4.

DETAILED DESCRIPTION OF THE INVENTION

Figure 1:
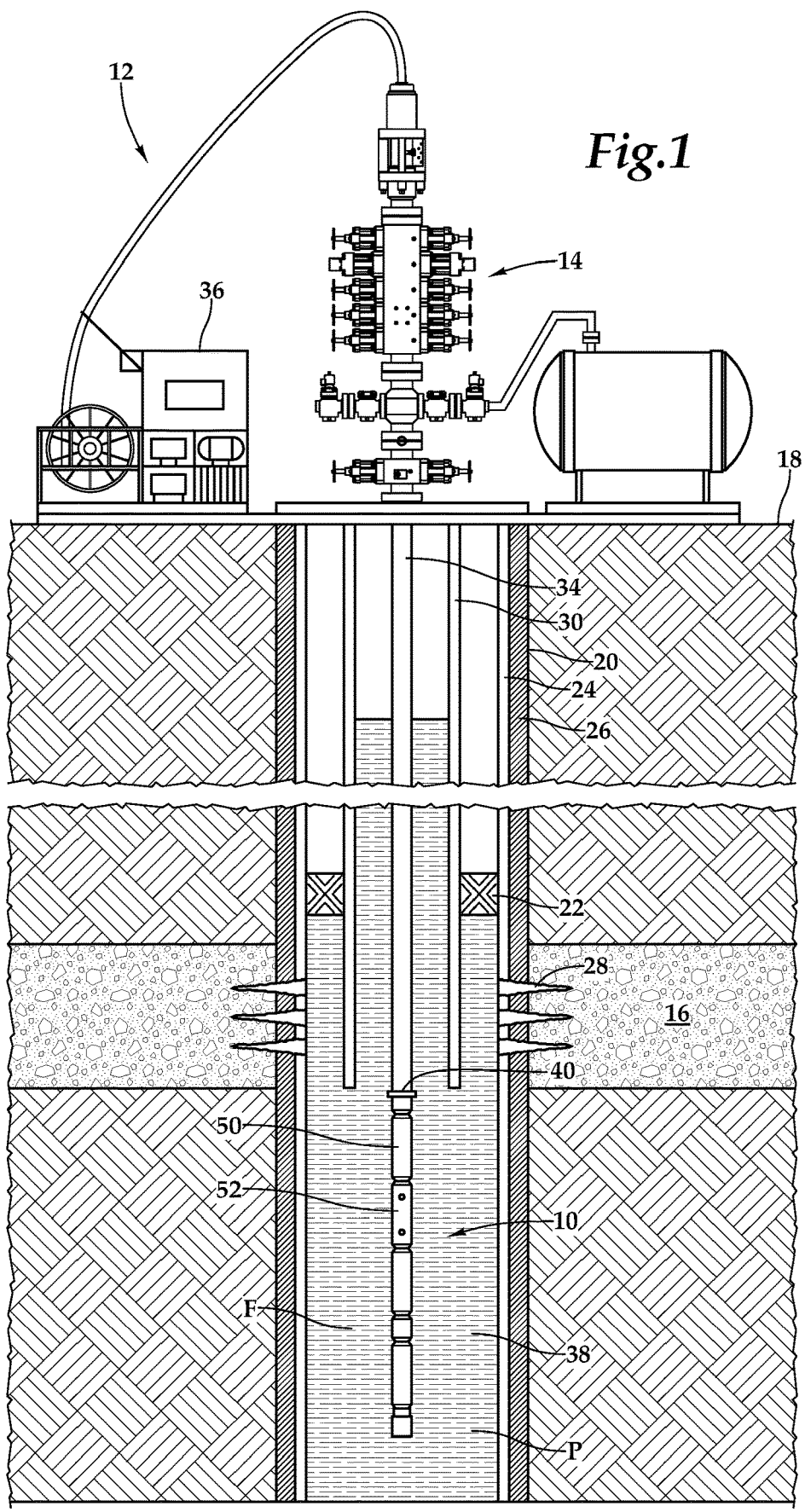
FIG. 1 is a schematic illustration depicting one embodiment of an onshore hydrocarbon production operation employing a solid particle handling assembly, according to the teachings presented herein.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Referring initially to FIG. 1, therein is depicted one embodiment of a submersible pump assembly 10 being employed in an onshore hydrocarbon production operation 12, which may be producing oil, gas, or a combination thereof, for example. A wellhead 14 is positioned over a subterranean hydrocarbon formation 16, which is located below a surface 18. A wellbore 20 extends through the various earth strata including the subterranean hydrocarbon formation 16. A casing string 24 lines the wellbore 20 and the casing string 24 is cemented into place with cement 26. Perforations 28 provide fluid communication from the subterranean hydrocarbon formation 16 to the interior of the wellbore 20. A packer 22 provides a fluid seal between a production tubing 30 and the casing string 24. Tubing 34, which may be a type of production tubing or form a portion of the production tubing 30, runs from the surface 18, wherein various surface equipment 36 is located, to a fluid accumulation zone 38 containing a fluid medium F having a low viscosity, such as hydrocarbons like oil or gas, fracture fluids, water, or a combination thereof. The fluid medium F includes solid particles P. As shown, the submersible pump assembly 10 is coupled to a lower end 40 of the tubing 34. The submersible pump assembly 10 includes a solid particle handling assembly 50 and a downhole pump 52.

Referring now to FIG. 2 and FIG. 3, as shown, the submersible pump assembly 10, having the particle solid handling assembly 50 and the downhole pump 52, is positioned in the fluid accumulation zone 38 defined by the casing string 24 cemented by the cement 26 within the wellbore 20. The submersible pump assembly 10 is incorporated into a downhole tool 70 connected to the lower end 40 of the production tubing 30. As shown, the downhole pump 52 may include ports 54, 56. Other tools, including tools 58, 60, 62, and connector members 64, 66 may be part of the downhole tool 70. It should be appreciated that a variety of pump unit-configurations may be employed and number of pump units, as well as ports, may vary depending on the particular application that the submersible pump assembly 10 is assigned. By way of example, the pump unit 52 may be a centrifugal pump, reciprocating pump, sucker rod pump, or other pump operatable at a low fluid flow rate, for example.

In operation, the processes of to begin transferring the fluid medium F having the solid particles P, the submersible pump assembly 10 is positioned in the fluid accumulation zone 38. Initially, as shown best in FIG. 2, the submersible pump assembly 10 is completely submerged in the fluid medium F, which, as mentioned, may include hydrocarbons such as oil and/or gas, fracture fluid, water, or combinations thereof, as well as solid particles P. The submersible pump assembly 10 is actuated and operation of the pump unit 52 begins. As time progresses, as shown best in FIG. 3, the submersible pump assembly 10 pumps the fluid medium F, which may be a production fluid or a production inhibiting fluid, for example, having the solid particles P to the surface 18. The process of pumping the fluid medium F continues until the submersible pump assembly 10 is stopped. The solid particle handling assembly 50, as will be described in additional detail hereinbelow, ensures the efficient separation and storage of solid particles P from the fluid medium F, minimizing potential obstructions and enhancing the overall operational longevity of the downhole pump 52.

Referring now to FIG. 4 and FIG. 5, the submersible pump assembly 10 for transference of the fluid medium F with the solid particles P is depicted in additional detail. As mentioned, downhole pumps, such as the downhole pump 52, play a crucial role in the transportation of the fluid medium F including hydrocarbons and the solid particles P from deep underground reservoirs to the surface. One of the persistent challenges in downhole operations is the accumulation of solid particles, such as solid particles P, which often hampers the efficiency and life span of these downhole pumps. Addressing this, the designs as illustrated in FIG. 4 and FIG. 5 present one embodiment of the solid particle handling assembly 50 aimed at mitigating the accumulation of such particles, ensuring smoother operations and reduced pump maintenance.

With respect to the solid particle handling assembly 50, an outer tubing 80 includes an inner diameter 82 and functions to transport the fluid medium F, which can range from hydrocarbons like oil or gas to water or combinations of these, from the downhole pump 52 towards the surface S. In some embodiments, the outer tubing 80 may form a portion of the production tubing 30. Nested within the outer tubing 80, an inner tubing 84 exhibits an inner diameter 86 that is smaller than the inner diameter 82 of the outer tubing 80. This design ensures that an annular space 88 is generated between the outer tubing 80 and the inner tubing 84. As shown, the inner tubing 84 is positioned in fluid communication with the downhole pump 52. The solid particle handling assembly 50 includes a connector housing 90 to secure the solid particle handling assembly 50 to the downhole pump 52. A designated storage area 92 is located within the annular space 88. The designated storage area 92 area acts as a repository for solid particles P, as will be described in additional detail below.

A diverter 100 is superposed to the inner tubing 84 and positioned within the outer tubing 80. In generally, the diverter 100 includes a shape configured to redirect fluid medium flow, pushing solid particles P in the fluid medium F towards a wall 102 of the outer tubing 80 where vertical speed of the fluid medium F is minimal, causing solid particles P to travel downward within the outer tubing 80 and accumulate within the designated storage area 92. In the illustrated embodiment, the diverter 100 includes a collar 104 secured to an end 106 of the inner tubing 84. Risers 108 extend from the collar 104 to support a body 110 having a contact surface 112. Various flow channels 114 for the passage of the fluid medium F and the solid particles P are present through the risers 108. The contact surface 112 of the body 110 may have various forms, including, for example, a section of a conical shape, a convex surface, or a concave surface.

With respect to downhole pump 52, a housing 130 includes cylinder blocks 132, 134 having multiple cylinders, including, for example, cylinders 136, 138, 140, 142, formed therein. A chamber 144 positioned in fluid communication with a connection port 146 and a connection interface 148 provides for the transport of the fluid medium F toward the solid particle handling assembly 50 and the surface S. It should be appreciated that the downhole pump 52 may include various other configurations and components, such as pistons and sealing components to prevent any connection from being compromised.

In an active pumping or active operational mode when the downhole pump 52 is active, the fluid medium F including solid particles P is transferred from the chamber 144 to the connection port 146 to the connection interface 148 during the reciprocating motion of the pistons associated with the downhole pump 52. That is, the fluid medium F with the solid particles P flows as shown by arrows A, B into the inner tubing 84. As previously alluded, the inner tubing is configured to increase fluid speed when the fluid medium F including the solid particles P enters from the downhole pump 52. This increase in speed facilitates the vertical movement of the solid particles P.

The fluid medium F with the solid particles P flows upward through the inner tubing 84 and exits the inner tubing 84 proximate the diverter 100. When the fluid medium exits the inner tubing 84, there is an inevitable drop in its speed. Taking advantage of this deceleration, the storage area 92 accumulates the descending solid particles P, ensuring they don't interfere with the operations of the downhole pump 52. As discussed, the diverter 100 includes a shape configured to redirect fluid medium flow, pushing solid particles P in the fluid medium F towards a wall 102 of the outer tubing 80 (Arrows D, E) where vertical speed of the fluid medium F is minimal, causing the solid particles P to travel downward within the outer tubing 80 and accumulate within the designated storage area 92 (Arrows F, G). T The fluid medium F, on the other hand, travels toward the surface S (Arrows H, I). In the illustrated embodiment, the diverter 100 is optimized to provide circulation of flow to ensure deposition of the solid particles P at the bottom of the designated storage area 92 without introducing high pressure losses and turbulent flow of the media. Further, in the illustrated embodiment, the diverter 100 is optimized to prevent fine dust particles from falling back into the inner tubing 84 when the downhole pump operation is stopped, thereby ensuring uninterrupted fluid flow and preventing blockage of the downhole pump 52.

The submersible pump assembly 10 demonstrates significant improvements in operational efficiency and reduced frequency of maintenance interventions compared to conventional systems. These benefits are particularly evident in operations involving high volumes of solid particles or in wells with challenging geological formations. The concepts embodied in the submersible pump assembly 10 make it particularly suitable for use in a range of hydrocarbon production operations, including those in extreme environments. In conclusion, the submersible pump assembly 10, with its innovative solid particle handling assembly 50 and customizable downhole pump 52, represents a significant advancement in the field of downhole fluid management. Its design and functionality address several longstanding challenges in the industry, offering improved reliability, efficiency, and adaptability. Such technology has a wide range of applications in hydrocarbon production and may also be adaptable for use in other industries requiring efficient fluid handling particle and solid separation under challenging conditions.

The order of execution or performance of the methods and techniques illustrated and described herein is not essential, unless otherwise specified. That is, elements of the methods and techniques may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A solid particle handling assembly for preventing accumulation of solid particles relative to a downhole pump, the solid particle handling assembly comprising:
    an outer tubing having a first inner diameter, the outer tubing being configured to transport a fluid medium from a downhole pump toward a surface;
    an inner tubing having a second inner diameter less than the first inner diameter of the outer tubing, the inner tubing being positioned in fluid communication with the downhole pump such that an annular space is formed between the outer tubing and the inner tubing, the inner tubing preventing direct fluid communication between the inner tubing and the outer tubing until the fluid medium exits an end of the inner tubing, the inner tubing increasing fluid speed through the inner tubing relative to fluid speed in the outer tubing as the fluid medium enters the inner tubing from the downhole pump and exits the end of the inner tubing, thereby facilitating vertical movement of solid particles;
    a designated storage area formed in the annular space, wherein the storage area is configured to accumulate solid particles that drop down due to a decrease in fluid speed upon the fluid medium exiting the end of the inner tubing; and
    a diverter superposed to the inner tubing and positioned within the outer tubing, wherein the diverter comprises a shape configured to redirect fluid medium flow, pushing solid particles in the fluid medium towards a wall of the outer tubing where vertical speed of the fluid medium is minimal, causing solid particles to travel downward within the outer tubing and accumulate within the designated storage area.

2. The solid particle handling assembly as recited in claim 1, wherein the outer tubing further comprises production tubing.

3. The solid particle handling assembly as recited in claim 1, wherein the downhole pump operates at a low fluid flow rate suitable for a well producing fluid mediums with the solid particles, the low flow rate being a fluid flow that does not allow for the solid particles to be vertically transported by the fluid flow.

4. The solid particle handling assembly as recited in claim 1, wherein the shape of the diverter is a conical shape configured to provide circulation of flow to ensure deposition of solids at the bottom of the designated storage area without introducing pressure losses and turbulent flow of the media.

5. The solid particle handling assembly as recited in claim 1, wherein the shape of the diverter further comprises a conical shape configured to prevent dust particles from falling back into the inner tubing when the downhole pump operation is stopped, thereby ensuring uninterrupted fluid flow and preventing blockage of the downhole pump.

6. The solid particle handling assembly as recited in claim 1, wherein the diverter further comprises:
    a collar secured to an end of the inner tubing;
    a plurality of risers extending from the collar to a body having a contact surface; and
    a plurality of flow channels through the plurality of risers.

7. The solid particle handling assembly as recited in claim 6, wherein the contact surface further comprises a section of a conical shape.

8. The solid particle handling assembly as recited in claim 1, wherein the assembly is configured to be used with the fluid medium, the fluid medium comprising a medium selected from the group consisting of hydrocarbons, water, and combinations thereof.

9. The solid particle handling assembly as recited in claim 8, wherein the hydrocarbons further comprise oil.

10. The solid particle handling assembly as recited in claim 8, wherein the hydrocarbons further comprise gas.

11. A solid particle handling assembly for preventing accumulation of solid particles relative to a downhole pump, the solid particle handling assembly comprising:
    an inner tubing positioned in fluid communication with the downhole pump such that an annular space is formed between a production tubing and the inner tubing, the inner tubing preventing direct fluid communication between the inner tubing and the outer tubing until the fluid medium exits an end of the inner tubing, the inner tubing increasing fluid speed through the inner tubing relative to fluid speed in the outer tubing as the fluid medium enters the inner tubing from the downhole pump and exits the end of the inner tubing, thereby facilitating vertical movement of solid particles;

a designated storage area formed in the annular space, wherein the storage area is configured to accumulate solid particles that drop down due to a decrease in fluid speed upon the fluid medium exiting the end of the inner tubing; and a diverter superposed to the inner tubing, wherein the diverter comprises a shape configured to redirect fluid flow, pushing solid particles in the fluid medium towards a wall of the production tubing where vertical speed of the fluid medium is minimal, causing solid particles to travel downward within the production tubing and accumulate within the designated storage area.

12. The solid particle handling assembly as recited in claim 11, wherein the diverter further comprises:

a collar secured to an end of the inner tubing;

a plurality of risers extending from the collar to a body having a contact surface; and a plurality of flow channels through the plurality of risers.

13. The solid particle handling assembly as recited in claim 11, wherein the contact surface further comprises a section of a conical shape.

14. A solid particle handling assembly for preventing accumulation of solid particles relative to a downhole pump, the solid particle handling assembly comprising:

an outer tubing having a first inner diameter, the outer tubing being configured to transport a fluid medium from a downhole pump toward a surface;

an inner tubing having a second inner diameter less than the first inner diameter of the outer tubing, the inner tubing being positioned in fluid communication with the downhole pump such that an annular space is formed between the outer tubing and the inner tubing, the inner tubing preventing direct fluid communication between the inner tubing and the outer tubing until the fluid medium exits an end of the inner tubing, the inner tubing increasing fluid speed through the inner tubing relative to fluid speed in the outer tubing as the fluid medium enters the inner tubing from the downhole pump and exits the end of the inner tubing, thereby facilitating vertical movement of solid particles;

a designated storage area formed in the annular space, wherein the storage area is configured to accumulate solid particles that drop down due to a decrease in fluid speed upon the fluid medium exiting the end of the inner tubing into the annular space; and a diverter including a collar secured to an end of the inner tubing with a plurality of risers extending from the collar to a body having a contact surface, the diverter configured to redirect fluid flow, pushing solid particles in the fluid medium towards a wall of the outer tubing where vertical speed of the fluid medium is minimal, causing solid particles to travel downward within the production tubing and accumulate within the designated storage area.

15. The solid particle handling assembly as recited in claim 14, wherein the contact surface further comprises a section of a conical shape.

* * * * *